US007644423B2

(12) United States Patent
Ludvig et al.

(10) Patent No.: US 7,644,423 B2
(45) Date of Patent: Jan. 5, 2010

(54) SYSTEM AND METHOD FOR GENERATING MEDIA CONSUMPTION STATISTICS

(75) Inventors: Edward A. Ludvig, Redwood City, CA (US); Todd A. Lund, Santa Clara, CA (US); Gopal Sundaram, San Jose, CA (US)

(73) Assignee: Microsoft Corporation, Redmond, WA (US)

( * ) Notice: Subject to any disclaimer, the term of this patent is extended or adjusted under 35 U.S.C. 154(b) by 1027 days.

(21) Appl. No.: 10/955,700

(22) Filed: Sep. 30, 2004

(65) Prior Publication Data

US 2006/0075420 A1 Apr. 6, 2006

(51) Int. Cl.
*H04H 60/33* (2008.01)
*H04H 60/32* (2008.01)

(52) U.S. Cl. .............................. 725/9; 725/10; 725/14
(58) Field of Classification Search ................ 725/9–21
See application file for complete search history.

(56) References Cited

U.S. PATENT DOCUMENTS

| | | | | |
|---|---|---|---|---|
| 4,695,879 | A * | 9/1987 | Weinblatt | 725/10 |
| 6,286,005 | B1 * | 9/2001 | Cannon | 707/100 |
| 6,286,140 | B1 * | 9/2001 | Ivanyi | 725/14 |
| 7,197,472 | B2 * | 3/2007 | Conkwright et al. | 705/10 |
| 2003/0084448 | A1 * | 5/2003 | Soundararajan | 725/14 |
| 2003/0101451 | A1 * | 5/2003 | Bentolila et al. | 725/34 |
| 2004/0003394 | A1 * | 1/2004 | Ramaswamy | 725/28 |
| 2004/0024777 | A1 * | 2/2004 | Schaffer | 707/103 R |
| 2005/0149964 | A1 * | 7/2005 | Thomas et al. | 725/9 |
| 2007/0240181 | A1 * | 10/2007 | Eldering et al. | 725/14 |

\* cited by examiner

*Primary Examiner*—Brian T Pendleton
*Assistant Examiner*—Dika C Okeke
(74) *Attorney, Agent, or Firm*—Lee & Hayes, PLLC

(57) ABSTRACT

Techniques are described for generating statistics that reflect the consumption of media resources, such as television program resources. The techniques involve polling a group of devices identified in a random sample list or a custom sample list to collect event data describing the consumption of resources by the devices. Lower-bound and upper-bound thresholds are applied to remove or modify event data that may not accurately reflect the legitimate consumption of resources. Varying probability weights can also be assigned to events to reflect their likelihood of representing the legitimate consumption of resources. Based on such filtered event data, for a given device, a computation technique computes the percentage of time that the user has consumed a particular resource relative to a total amount of time in a time segment. Similar percentages are computed for other devices and other time segments to provide plural percentage values. Rating information and share information are computed based on these calculated percentage values. The tracking functionality compiles the calculated statistics into various web-enabled UI presentations and provides these reports to an operator over an intranet or like network.

26 Claims, 8 Drawing Sheets

Exemplary Event Collection

Report Manager

File  Edit  View  Favorites  Tools  Help

View | Properties | History | Subscriptions

Date: 31  Month: May  [View Report]
Year: 2004  Select a Group Name: Sports

| 1 | of 1 | 100% | | Find | Next | Select a Format |

802

Tracking Report for May 31, 2004
(For Ratings or Share)

| Group: Sports | 00:00 | 00:30 | 01:00 | 01:30 | 02:00 | 02:30 | 03:00 |
|---|---|---|---|---|---|---|---|
| ESPN International | #### | #### | #### | #### | #### | #### | #### |
| SE20 ESPN 2 | #### | #### | #### | #### | #### | #### | #### |
| SE21 ESPN | #### | #### | #### | #### | #### | #### | #### |
| SE24 FOX SPORTS | #### | #### | #### | #### | #### | #### | #### |
| DLA_EuropSportsNews | #### | #### | #### | #### | #### | #### | #### |
| DLA_Noticias Deportiva | #### | #### | #### | #### | #### | #### | #### |
| DS58 (Speedvision) | #### | #### | #### | #### | #### | #### | #### |
| ESPN 2 | #### | #### | #### | #### | #### | #### | #### |
| Fox Sports | #### | #### | #### | #### | #### | #### | #### |
| Sum | #### | #### | #### | #### | #### | #### | #### |
| Total | #### | #### | #### | #### | #### | #### | #### |

SYSTEM AND METHOD FOR GENERATING MEDIA CONSUMPTION STATISTICS

TECHNICAL FIELD

This invention relates to strategies for generating statistics that reflect the consumption of resources, and, in a more specific implementation, to electronic systems and associated methods for generating statistics that reflect the consumption of media resources, such as television programs.

BACKGROUND

Various entities involved in the distribution of television programs are keenly interested in determining the number of viewers who have watched a particular program. For instance, among many applications, these entities may use this information to adjust the schedule of programs, the lineup of channels, the assessed value of advertisements that air during certain programs, and so forth.

The television industry relies on a variety of statistical measurements to reflect the number of viewers who have watched a particular program. Two common measurements are ratings and shares. A rating measurement is representative of the number of television units that have presented a particular program relative to a total number of television units that were capable of presenting this program. For instance, assume that a television network provides services to a hypothetical pool of 100 set-top boxes associated with 100 television units. If 30 of these set-top boxes are tuned to a particular program, then the rating of that program is 30%. On the other hand, a share measurement is representative of the number of television units that presented a particular program relative to a total number of television units that were actually presenting programs in a prescribed time frame. For example, assume that 30 set-top boxes in the above example were tuned to a particular program, but only 60 set-top boxes of the entire pool of 100 set-top were turned on. In this case, the share of this program is 50%.

The industry has provided a number of techniques that can be used to collect the raw data from which rating and share measurements can be computed. In one traditional technique, an entity conducting a survey selects a sample pool of viewers and forwards viewing logs (also known as diaries) to these viewers. The entity instructs these viewers to record an indication of the programs that they have watched over a prescribed period of time, and then, at the end of this time, to send the logs back to the entity. The entity then aggregates the entries in the logs and computes various statistics.

Because of the complex nature of viewing habits, entities conducting surveys may make various simplifying assumptions regarding a viewer's behavior. For instance, it is common to instruct a viewer to indicate that the viewer has watched a program if the viewer has watched the program for more than a prescribed amount of time (e.g., 8 minutes).

There is room for considerable improvement to traditional techniques for computing viewing statistics. For instance, the above-described manual technique of computing statistics is labor-intensive and error-prone. Further, the simplifying assumptions used in traditional techniques have the potential of providing skewed—that is, potentially inaccurate—viewing statistics. More specifically, the simplifying assumptions can sometimes result in viewing estimates that are unduly high, and/or viewing estimates that are potentially contradictory (e.g., by falsely indicating that a user simultaneously watched two programs within a given reporting interval).

There is accordingly a need for more convenient and reliable techniques for generating statistics that reflect the consumption of media resources, such as, but not limited to, television programs.

SUMMARY

According to one exemplary implementation, a method is described for generating statistical information that reflects the consumption of at least one resource. The method comprises: (a) collecting event data from a plurality of devices, wherein the event data identifies consumption behavior of respective users who operate the plurality of devices; (b) computing a measure of a user's consumption of the resource within a defined time segment by: (i) identifying the amount of time that the user has consumed the resource within the defined time segment; and (ii) dividing the amount of time that the user consumed the resource by the total amount of time in the time segment, to provide a fractional consumption measure; (c) repeating the computing of the measure for plural users and for plural time segments to provide a plurality of fractional consumption measures; (d) generating statistical information on the basis of the fractional consumption measures; and (e) providing a report that identifies the statistical information.

According to another exemplary feature, the resource is a media resource, such as a television program disseminated by a television program dissemination system.

According to another exemplary feature, the devices comprise set-top boxes coupled to respective television units.

According to another exemplary feature, the generating of statistical information comprises generating rating information by computing an average of the fractional consumption measures for a particular time segment.

According to another exemplary feature, the generating of statistical information comprises generating share information by computing the total number of users consuming the resource divided by the total number of users consuming a total number of resources for a particular time segment.

According to another exemplary feature, a filtering operation is performed on the event data to eliminate event data that represents a consumption event having a duration below a defined lower-bound threshold.

According to another exemplary feature, the filtering operation also modifies event data that represents a consumption event having a duration above a defined upper-bound threshold, to thereby truncate the duration at the upper-bound threshold.

According to another exemplary feature, the filtering operation can also assign a weight to the event data which conveys the likelihood that the corresponding event represents a legitimate consumption of the resource. More specifically, the filtering operation can use a weighting function having an exponentially decaying shape to define the weight.

According to another exemplary feature, the above-recited collecting of event data comprises polling the plurality of devices based on their membership in a sampling list. The sampling list can be randomly generated or manually generated by an operator.

Additional implementations and features will be described in the following.

BRIEF DESCRIPTION OF THE DRAWINGS

FIG. 8 shows an exemplary UI presentation that provides rating or share information regarding resource consumption, computed on the basis of the collected event data.

Figure 1:
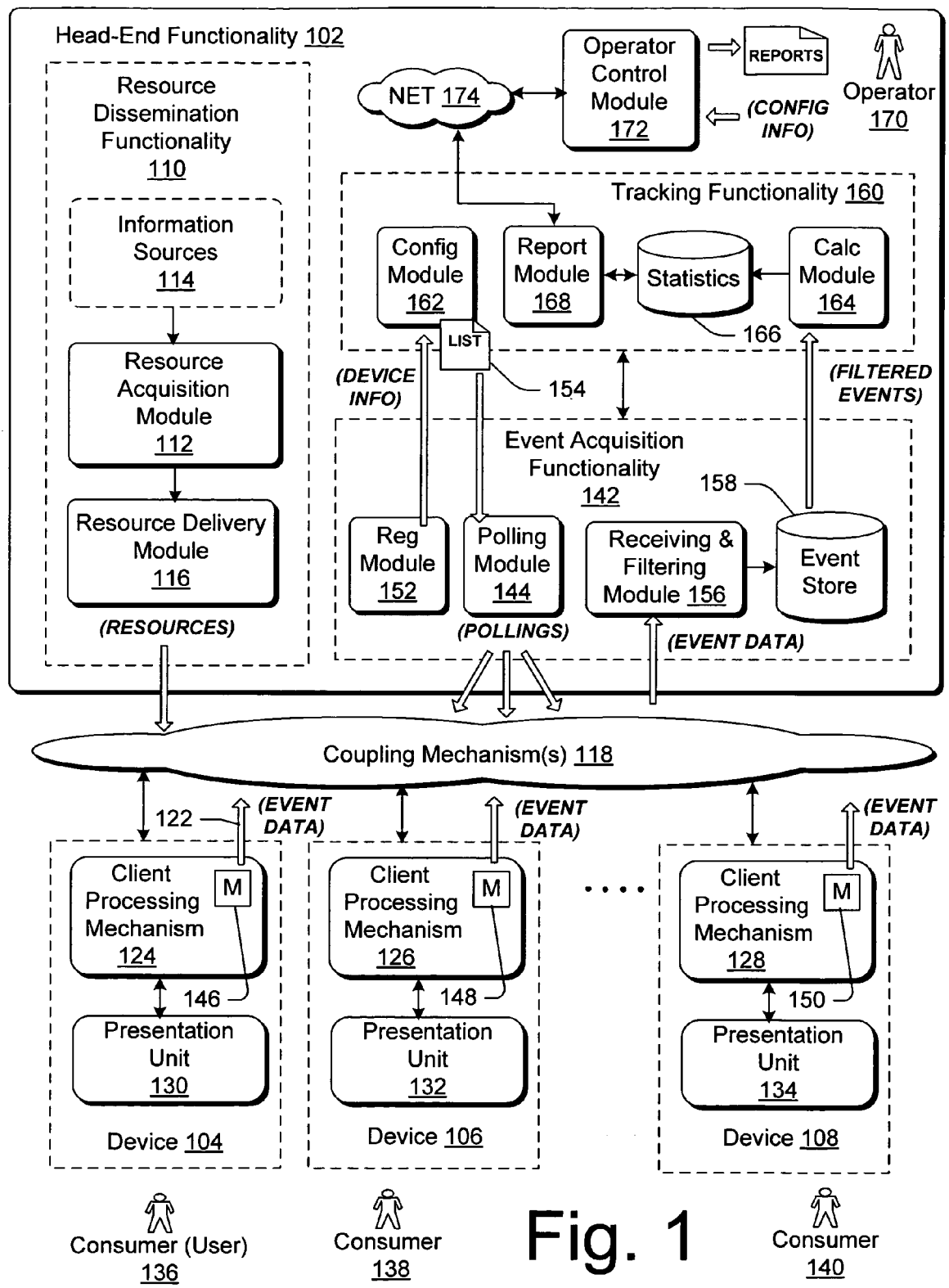
FIG. 1 shows an exemplary system for collecting consumption event data and generating consumption statistics, including head-end functionality coupled to a plurality of devices.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

According to one exemplary implementation, strategies are described herein for automatically collecting event data that reflects the consumption of resources, and for computing various statistics based on the event data. In a more particular implementation, strategies are described for automatically collecting event data that reflects the number of users who have consumed particular media resources (such as television programs presented on particular television channels), and for computing rating and share statistics based on this event data. For instance, one exemplary strategy described herein calculates a fractional consumption measure that reflects a user's consumption of a particular resource within a defined time segment (e.g., 30 minutes, etc.) by dividing the amount of time that the user has consumed the resource in the time segment by the total amount of time in the time segment. This process is repeated for a pool of sampled devices, over a plurality of time segments and over a plurality of resources. This information, in turn, can be used to compute various statistics, such as rating and share information.

In one exemplary strategy, one or more filters can be employed to remove or modify event data that may inaccurately represent the consumption of resources. For instance, a lower-bound "floor" filter can be applied which removes event data that describes brief periods of resource consumption. Such brief periods may correspond to quick channel changes (e.g., caused by "channel surfing") that do not represent the meaningful consumption of resources. An upper-bound "ceiling" filter can be applied which truncates events that extend beyond an upper-bound threshold. Such long periods may indicate that a user is no longer actively consuming a resource, even though the user's device may still be tuned to the resource. In another strategy, a filter can be applied which does not apply bright-line thresholds to remove or truncate event data. Rather, in this implementation, the technique uses a weighting function to assign a probability to the event data which reflects the likelihood that the event data corresponds to the legitimate consumption of resources. For instance, this technique can apply an exponentially-decreasing weighting function to assess the likelihood that a user is actually consuming resources. Namely, in this implementation, as the duration of the user's consumption increases without the user taking some action vis-à-vis the resource, the likelihood of legitimate resource consumption exponentially declines.

Various systems are described for implementing the above-described strategies. For instance, in one implementation, event acquisition functionality is provided for automatically extracting event data from a pool of resource presentation devices. The event acquisition functionality polls a sample of the devices identified by a random sample list or custom-generated sample list. Tracking functionality receives the event data collected by the event acquisition functionality and computes the above-described statistics. UI functionality allows an operator to specify configuration information which governs various aspects of the behavior of the event acquisition functionality and the tracking functionality. The UI functionality also presents the statistics to the operator in various operator-defined reports.

The strategies described above have numerous advantages. For instance, the strategies provide highly automated mechanisms for collecting and processing event data. This reduces some of the burden associated with generating statistics, compared to traditional manual techniques. Further, the strategies measure a user's consumption of resources without imposing artificial assumptions or rough approximations, as do some traditional techniques. Therefore, the techniques have the potential of providing more accurate results compared to some traditional techniques.

Still other features and attendant benefits will be apparent to those skilled in the art upon reading the following discussion.

As to terminology, in one non-limiting case, the term "resource" pertains to any information that can be consumed by a user. The resource may be in digital form, analog form, or a combination of analog or digital forms. The resource may include, or may omit, interactive content. The provider of the resource may charge a fee to consume its resources, or may disseminate these resources free of charge. A specific class of resources may pertain to media resources. The media resources can include any information configured to convey audio and/or video information, such as audio resources (e.g., music, etc.), still picture resources (e.g., digital photographs, etc.), moving picture resources (e.g., audio-visual television programs, movies, etc.), computer programs (e.g., games, etc.), markup language resources (e.g., hypertext markup language resources received via a wide area packet network), and so on. To facilitate discussion, the term "resource" will be used most frequently in the context of the distribution of television programs over a number of channels to a pool of recipient set-top boxes and associated television units. However, as indicated above, the strategies described herein have broad application to other kinds of environments which involve the dissemination of other kinds of resources, such as music.

The term "event" refers to an occurrence which, in some way, represents some aspect of the consumption of a resource. The term "event data" refers to any kind of information which describes the event.

This disclosure includes: Section A which describes an exemplary system for generating statistics; Section B which describes exemplary procedures for computing the statistics; and Section C which describes exemplary user interface (UI) presentations that provide statistics to an operator, and which allow the operator to enter configuration information which governs the operation of the system.

A. Exemplary System

FIG. 1 shows an exemplary system 100 for gauging the consumption of resources by consumers. Generally, any of the functions described with reference to the figures can be implemented using software, firmware (e.g., fixed logic circuitry), manual processing, or a combination of these implementations. The term "logic, "module" or "functionality" as used herein generally represents software, firmware, or a combination of software and firmware. For instance, in the case of a software implementation, the term "logic," "module," or "functionality" represents program code that performs specified tasks when executed on a processing device or devices (e.g., CPU or CPUs). The program code can be stored in one or more computer readable memory devices. More generally, the illustrated separation of logic, modules and functionality into distinct units may reflect an actual physical grouping and allocation of such software and/or hardware, or can correspond to a conceptual allocation of different tasks performed by a single software program and/or hardware unit. The illustrated logic, modules and functionality can be located at a single site (e.g., as implemented by a processing device), or can be distributed over plural locations.

A.1. Overview of the System

Broadly, the system 100 defines electronic infrastructure for delivering resources to consumers, for collecting event data from users (consumers), and for analyzing the event data. The system 100 includes head-end functionality 102 which interacts with a plurality of local devices (104, 106, ... 108). The head-end functionality 102 loosely corresponds to a collection of remote functionality used to coordinate and manage the entire electronic infrastructure. The local devices (104, 106, ... 108) correspond to functionality used by consumers to receive resources from the head-end functionality 102, and to transmit event data which reflect the devices' consumption of resources. Aspects of the head-end functionality 102 and the devices (104, 106, ... 108) will be described below.

The head-end functionality 102 can include resource dissemination functionality 110 for delivering resources to recipients, such as television programs and movies. This functionality 110 can include a resource acquisition module 112 which receives resources from one or more sources 114. The sources 114 can represent a head-end database which stores resources for consumption at scheduled times or on an on-demand basis. Or the sources 114 can represent external entities which separately provide resources for distribution by the functionality 110. More generally, the resources can originate from live sources or pre-recorded sources. Live sources correspond to sources that supply programs that capture live events, or programs that otherwise have some real-time aspect associated with them. Pre-recorded sources correspond to sources that supply programs that have been already recorded in their entirety.

A resource delivery module 116 supplies the resources to the devices (104, 106, ... 108) over coupling mechanism 118. In one system, the coupling mechanism 118 provides any one of, or any combination of a cable delivery mechanism, a wireless broadcast (earthbound antenna) delivery mechanism, a satellite broadcast delivery mechanism, any kind of digital network delivery mechanism, and so forth. Although not shown, the coupling mechanism 118 can include any combination of hardwired and wireless lines, gateways, routers, name servers, telecommunication lines, Digital Subscriber Line (DSL) functionality, and so forth.

The coupling mechanism 118 also provides a return path (up-link) that enables the devices (104, 106, ... 108) to communicate with the head-end functionality 102. In one case, the coupling mechanism 118 uses different technologies and/or techniques to implement the down-link and up-link. For instance, the head-end functionality 102 can use a conventional cable infrastructure to provide resources to the devices (104, 106, ... 108), while the devices (104, 106, ... 108) can use dial-up telecommunication lines to communicate with the head-end functionality 102. In another case, the coupling mechanism 118 uses the same technology and techniques to implement both the down-link and the up-link. For instance, the system 100 can use any kind digital network to perform two-way communication between the head-end functionality 102 and the devices (104, 106, ... 108). In one particular case, this two-way communication can be implemented using DSL functionality that provides two-way communication using telecommunication lines between the head-end functionality 102 and the devices (104, 106, ... 108).

The return path from the devices (104, 106, ... 108) to the head-end functionality 102 can be used by the devices (104, 106, ... 108) to forward event data to the head-end functionality 102. Event data refers to information that represents the consumption of resources by the devices (104, 106, ... 108). In one case, the devices (104, 106, ... 108) transmit event data to notify the head-end functionality when the devices (104, 106, ... 108) have been turned on and off, and when their respective users switch among resources (e.g., when the users change channels). FIG. 1 illustrates the above-identified concepts by showing that the resource presentation functionality 110 transmits resources 120 to exemplary devices 104, and the device 104 transmits event data 122 to the head-end functionality 102. The event data 122 represents actions taken by a user in consuming the resources 120.

As the term "device" is broadly used herein, the devices (104, 106, ... 108) can represent any combination of functionality used to process and present resources. FIG. 1 shows that the devices (104, 106, ... 108) can include respective processing mechanisms (124, 126, ... 128). The processing mechanisms (124, 126, ... 128) are coupled to respective presentation units (130, 132, ... 134). In the implementation most commonly evoked in this discussion, the processing mechanisms (124, 126 .... 128) correspond to set-top boxes, and the presentation units (130, 132, ... 134) correspond to television sets that are coupled to the respective set-top boxes. In another implementation, the client processing mechanisms (124, 126, ... 128) can represent logic functionality (firmware and/or software) that is integrated into the presentation units ((130, 132, ... 134). In another case, the client processing mechanisms (124, 126, ... 128) can correspond to general purpose computing devices (such as personal computers), and the presentation units (130, 132, ... 134) can correspond to computer monitors or other output devices. This description provides merely an illustrative and non-limiting listing of different implementations of the devices (104, 106, ... 108).

Whatever the implementation, FIG. 1 shows a collection of users (136, 138, 140) who consume resources via respective devices (104, 106, ... 108). The users (136, 138, ... 140) can consume resources in a conventional manner by using a remote controller (not shown) or other input device to turn on the devices (104, 106, ... 108), change channels, and so forth.

Other parts of the head-end functionality 102 are devoted to the task of collecting consumption event data and generating consumption statistics based on the event data. In one implementation, the same commercial entity that administers the dissemination of resources (via the functionality 110) can also generate consumption statistics. In other implementations, different commercial entities can administer these two separate operations. In this case, the entity that generates consumption statistics can do so for several different resource dissemination systems (not shown). In one implementation, the resource dissemination functionality 110 is co-located with the statistics generation functionality. In another case, the resource dissemination functionality 110 and the statistics generation functionality can be housed at different physical sites.

Considered on a functional level, one part of the functionality used to process event data is the event acquisition functionality 142. As the name suggests, the general purpose of the event acquisition functionality 142 is to acquire event data from the devices (104, 106, . . . 108). To this end, a polling module 144 polls the devices (104, . . . 106, 108) at periodic intervals or on some other basis. The devices (104, 106, . . . 108) can include internal memories (146, 148, . . . 150) in their respective processing mechanisms (124, 126, . . . 128) for storing event data, such as event data indicating that the devices (106, 108, . . . 108) has been turned on, turned off, or that the user (136, 138, . . . 140) has changed channels, and so forth. In response to the polling of the polling module 144, the devices (104, 106, . . . 108) forward the stored event data to the head-end functionality 102. More specifically, the devices (104, 106, . . . 108) can forward the event data that has been stored in their memories (146, 148, . . . 150) since the devices (104, 106, . . . 108) were last polled.

The devices (104, 106, . . . 108) can forward event data in the form of discrete event logs. Each event log can include salient information regarding the events, including, for example timestamp information that defines when the event happened, device ID information that identifies the device which is sending event data, resource ID information which identifies the resource (e.g., channel) associated with the event, and so forth. Further salient event data can be derived from other event data. For instance, consider the event caused when a user switches from channel A to channel B. The duration of time that the user has watched channel A can be determined by subtracting a timestamp that identifies when the user first tuned to channel A from the timestamp that identifies when the user tuned to channel B. The devices (104, 106, . . . 106) can perform this computation, or functionality at the head-end 102 can perform this computation. Still alternatively, the devices (104, 106, . . . 108) can directly measure consumption duration using counter mechanisms which are triggered by channel change events, and so forth. This is merely an illustrative and non-limiting enumeration of different techniques for providing event data. In any case, it bears noting that the full scope of an event may be captured by considering plural event logs.

In one implementation, the event acquisition functionality 142 can include a registration module 152 which identifies the devices (104, 106, . . . 108) that can interact with the head-end functionality 102. The registration module 152 can also provide the status of these devices (104, 106, . . . 108) using flags or other indicia. For instance, the registration module 146 can identify the set of devices (104, 106, . . . 108) which have responded to prior polling messages. These devices (104, 106, . . . 108) are referred to as "in-tab" devices (104, 106, . . . 108). If a device fails to respond to polling messages for an extended period of time (e.g., 60 days), the registration module 152 may designate it as an inactive device.

The polling module 144 can apply different policies in polling the devices (104, 106, . . . 108). In one approach, the polling module 144 can poll every single device that is registered with the system 100, or every device that is registered with the system 100 that has an active status, and so forth. In other cases, the polling module 144 can poll only a sample of the entire pool of available devices (104, 106, . . . 108). For example, the polling module can receive a list 154 that identifies a subset of the entire pool of available devices (104, 106, . . . 108). Later parts of this description will explain various techniques used to generate such a list 154. Suffice it to say at this point that the list 154 can provide a randomly-generated list of devices (104, 106, . . . 108) or a custom list of devices (104, 106, . . . 108). The random list of devices is randomly generated, while the custom list of devices is manually generated by an operator by enumerating a specific list of devices (104, 106, . . . 108) to be sampled. In either case, the operator should ensure that the size and composition of the representative sample provides an accurate statistical representation of the entire pool of devices (104, 106, . . . 108), or at least some subset of the pool that the operator wishes to investigate. As described in Section C, to facilitate this task, the operator can specify a degree of sampling error that is permitted by inputting confidence level information and confidence interval information, whereupon the system can automatically calculate the size of the sample that is needed to satisfy these parameters.

Devices (104, 106, . . . 108) can forward their event data based on other strategies besides the polling techniques described above. In another implementation, the devices (104, 106, . . . 108) can, on their own initiative, forward event data to the event acquisition functionality 142. For instance, the devices (104, 106, . . . 108) can forward their event data to the event acquisition functionality 142 at periodic intervals, at prescribed times, or when the devices (104, 106, . . . 108) detect that their memories (146, 148, . . . 150) have reached a prescribed level of storage capacity. The event acquisition functionality 142 can perform sampling in this kind of setup by informing a subset of the devices (104, 106, . . . 108) when they should start sending their event data and when they should stop sending their event data; but once initiated, the devices (104, 106, . . . 108) can send their event data without being specifically polled by the event acquisition functionality 142.

The event acquisition functionality 142 includes a receiving and filtering module 156 for receiving the events from the devices (104, 106, . . . 108). The receiving and filtering module 156 can forward the event data to an event store 158. The event store 158 can be implemented as one or more databases, located at a single site or distributed over plural sites.

In one implementation, the event acquisition functionality 142 does not record all event data, but only that event data that likely represents the consumption of resources by users (136, 138, . . . 140). To this end, the receiving and filtering module 156 removes or modifies such non-legitimate event data. In one case, the receiving and filtering module 156 applies a lower-bound threshold which excludes event data that describes events having durations below the lower-bound threshold. This lower-bound threshold can be viewed as a "floor"; event data having durations beneath this floor are not stored in the event store 158.

In another case, the receiving and filtering module 156 applies an upper-bound threshold which modifies event data that describes events having durations above the upper-bound threshold. This upper-bound threshold can be viewed as a "ceiling"; events having durations above this ceiling are modified prior to storage in the event store 156. Namely, the event data can be modified so that the event it describes extends in duration no longer than the upper-bound duration threshold. Accordingly, this modification has the effect of truncating the event duration at the upper-bound threshold.

Illustrative examples will clarify the role of the lower-bound and upper-bound thresholds. The lower-bound threshold helps exclude events that are indicative of rapid channel changes, caused by the practice know as "channel surfing." For example, when a user quickly flips through a sequence of channels, the user's device may forward event data representative of these changes to the receiving and filtering module 156. These events will either directly or indirectly describe the brief length of time that the user spent viewing each channel. The receiving and filtering module 156 comes into play by applying the lower-bound threshold to this event data, having the effect of excluding the storage of this event data in the event store 158.

On the other hand, the upper-bound threshold truncates the duration of events in those cases where, despite a long duration of an event, it is unlikely that a user is actually consuming the resource. The assessed low probability of legitimate consumption is a based on the lack of user action while allegedly consuming the resource. For example, assume that a user has tuned to a particular channel and then falls asleep, or simply leaves the room to attend to other tasks. This means that after an initial tuning event, the user's device does not send another event for a relatively long period of time. For example, the user may finally turn the device off when he awakens or returns to the room. The receiving and filtering module 158 comes into play in this circumstance by applying the higher-bound threshold to these kinds of long-duration events, having the effect of truncating the duration of these events to the duration of the lower-bound threshold itself. The rationale for doing this is because it can be reasonably assumed that the user may have actually consumed the resource up to the duration marked by the upper-bound threshold, but not thereafter. In the implementation described above, the receiving and filtering module 156 can detect events of long duration by looking at power-off or channel-change events following an initial tuning event. But, if so configured, the receiving and filtering module 156 can use any user action as evidence that the user remains actively engaged in consuming a resource (such as volume change events, and so forth). This would require that the devices (104, 106, . . . 108) forward an expanded set of events to the event acquisition functionality 142.

In another case, instead of providing a bright-line threshold that reflects the likelihood of legitimate resource consumption, the receiving and filtering module 158 can assign a range of probabilities to events depending on the durations of the events. For example, the receiving and filtering module 158 can apply a decaying exponential function (probability=$e^{-\alpha t}$) to the event data. This function assigns a weighting score to the event based on its duration. More specifically, the decaying shape of the function means that this function assigns a relatively high probability for events of relatively short duration (although behavior that is indicative of channel surfing is excluded on the basis of its failure to meet the lower-bound threshold, as described above). However, the probability of legitimate consumption declines thereafter in exponential fashion. The parameter $\alpha$ in the exponential function can be selected to provide accurate predictions, based, for instance, on prior empirical observation. The use of an exponential function is merely illustrative; other kinds of mathematical functions can be used to compute the probability of legitimate viewing. Or empirically-derived look-up tables can be used to assign a weighting score to the event data.

The parameters that govern the behavior of the receiving and filtering module 156 can be defined by an operator. Namely, an operator can define the lower-bound threshold, the upper-bound threshold, and the $\alpha$ parameter in the weighting function, and so forth.

FIG. 1 shows that the receiving and filtering module 156 is included as a component of the event acquisition functionality 142. But other implementations are possible. For instance, the individual devices (104, 106, . . . 108) can apply any of the above-described filtering behavior to events when they are initially captured. The devices (104, 106, . . . 108) can thus apply filtering functionality on a local level to reduce the need to store and transfer certain event data to the event acquisition functionality 142. In another scenario, the event acquisition functionality 142 can record all the event data without exception. The tasks of excluding certain stored event data can then be allocated to other modules that utilize the event data stored in the event store 158. Still further implementations and variations of the filtering functionality are possible to suit different technical and business environments.

Providing that the event data satisfies the filtering constraints imposed by the receiving and filtering module 156, this module 156 stores the event data in the event store 158. In one case, the event store 158 can store information which identifies the device that generated the event data (e.g., a hashed device ID number), a source ID number which identifies the resource (e.g., channel) that was consumed by the device; a timestamp which identifies when the event occurred or when the event data was collected, etc., and duration information which identifies the duration of the event. The event store 158 can also store a number of other parameters, such as the total number of devices (104, 106, . . . 108) that were polled in the polling operation, and so forth.

The head-end functionality 102 also includes tracking functionality 160. This functionality 160 performs a number of roles directed to the generation of consumption-related statistics. FIG. 1 illustrates certain of these roles as separate functional modules. The functional modules can be implemented as code modules, firmware, or by some other mechanism.

First, the tracking functionality 160 includes a configuration module 162 which configures and governs certain aspects of the behavior of the event acquisition functionality 142, such as the polling module 144. The configuration module 162 can also configure the tracking functionality 160 itself to function in different ways.

Second, the tracking functionality 160 includes a calculation module 164 which receives event data from the event store 158 and perform statistical computations on this event data. The event data may have been filtered in the manner described above to remove or modify event data to more accurately reflect the actual consumption-related behavior of the users. The calculation module 164 can store the calculated statistics in a statistics store 166.

Third, the tracking functionality 160 includes a report module 168 for compiling computed statistics into various reports for output to an operator 170. The operator 170 can interact with the reporting module 168 through appropriate interfaces. For instance, in one implementation, the operator 162 can access the services of the reporting module 168 via a control module 172. The control module 172 can be coupled to the reporting module 168 via coupling mechanism 174. In the illustrative and non-limiting case of FIG. 1, the control module 172 corresponds to a general purpose computer which is coupled to the reporting module 168 via an intranet 174 governed by the TCP/IP protocols. Other kinds of coupling strategies can be used to establish this link. Further, FIG. 1 only shows a single operator 170 to facilitate discussion; in actually, more than one operator can interact with the reporting module 168 as clients.

The above-summarized features of the tracking functionality 160 will be described in further detail below.

Beginning with the configuration module 162, one function of this module 162 is to define a sampling list used by the polling module 144 to poll the devices (104, 106, . . . 108). This sampling list identifies a subset of an entire pool of available devices (104, 106, . . . 108). The configuration module 162 facilitates the generation of a random sample list or a custom sample list. In the case of a random sample list, the configuration module 162 can query the registration module 152. The registration module 152 responds by informing the configuration module 162 of an entire pool of devices (104, 106, . . . 108), identified by device ID numbers. The configuration module 162 can use this information to construct a list of a subset of devices, identified by device ID numbers or other suitable identification, and randomly selected. After the configuration module 162 forms this list, the configuration module 162 can forward the list (e.g., list 154) to the polling module 144. The polling module 144 uses this list 154 to determine what devices (104, 106, . . . 108) it should send polling message to.

In the case of a custom sampling list, the operator 170 or other entity can forward an express list of devices (104, 106, . . . 108) that should be polled. Again, the devices (104, 106, . . . 108) can be identified by specifying the device ID numbers associated with the devices (104, 106, . . . 108). In one implementation, the configuration module 162 validates the custom list in two stages. In one stage, the configuration module 162 determines whether the devices (104, 106, . . . 108) identified in the custom list are actually available for polling. This query can be answered in the negative in at least two circumstances. In a first case, a device ID in the list may not be registered at all. In a second case, an identified device may have become inactive, and it is therefore no longer available for polling. In both of these cases, the configuration module 162 can determine the availability of the devices by consulting the registration module 152. If the configuration module 162 determines that devices in the list are not available, it can strike their device numbers from the list. In another stage of validation, the configuration module 162 compares the custom list to a pre-defined schema. The schema defines the format that a custom list should use. To memorialize the results of the above-described two-stage validation, the configuration module 162 stores information regarding the outcome of the two-stage validation in a log file. In those circumstances where discrepancies were encountered, the configuration module 162 can store error-related information that describes these discrepancies in the log file.

The configuration module 162 can allow the operator 170 to define other kinds of configuration information which governs the behavior of certain aspects of the head-end functionality 102. For instance, the configuration module 162 can set the date and time at which the event acquisition functionality 142 should poll the devices (104, 106, . . . 108) in the sample, and the frequency at which the event acquisition functionality 142 should poll the devices (104, 106, . . . 108) after the initial polling operation. The configuration module 162 can also specify the timing at which new polling lists should be generated and forwarded to the polling module 144 (whereupon they replace/overwrite existing lists). The configuration module 162 can also specify the timing at which newly stored event data in the event store 156 should be forwarded to the tracking functionality 160 for analysis (as will be described below in greater detail). The configuration module 162 can play a role in defining numerous other configuration settings. In one implementation, the configuration module 162 can receive configuration settings from the operator 170, who enters these settings via a series of UI presentations made available by the report module 168 (as will be discussed in greater detail below in Section C).

Turning now to the calculation module 164, this module 164 can receive filtered event data from the event store 158 and perform computations on the event data to generate consumption statistics. In one mode of operation, the calculation module 164 can retrieve event data from the event store 158 when the operator 170 makes a specific request for a report which requires the analysis of a certain subset of the stored event data. This defines an "on the fly" method of performing calculations. In another case, the calculation module 164 can periodically retrieve blocks of recently stored event data and automatically generate consumption statistics based on this event data. In this implementation, the calculation module 164 can then store these statistics in the statistics database 166. The reporting module 168 can later draw from this database 166 of pre-computed statistics to satisfy report requests made by the operator 170. Still other strategies can be used to govern the manner in which the calculation module 162 performs computations.

Section B (below) provides detailed information regarding the specific statistical computations that the calculation module 164 can perform. As a preview to that section, the computation module 164 computes, for a device, the percentage of time that a user has consumed a particular resource relative to a total amount of time in a pre-defined time block segment. This percentage of time is also referred to herein as a "fractional consumption measure." For instance, if a user watched a particular television program 10 minutes out of a 30 time segment, then the percentage is 33.3%. The tracking functionality 160 repeats this same calculation for a plurality of users who are consuming a plurality of resources via other devices, and for a plurality of time segments. The above calculations can form the basis on which other statistical measurements can be computed, such as rating information and share information. Section B (below) describes the algorithms used to compute these statistical measures in detail. In general, the use of the above-described fractional consumption measures can provide a more accurate indication of the consumption of particular resources by a group of users, compared to traditional techniques which make rough assumptions regarding consumption based on whether a user has consumed the resource for more than a prescribed duration.

Turning finally to the reporting module 168, this module 168 can provide a number of user interface (UI) interface presentations which allow the user to interact with the tracking functionality 160. One series of UI presentations allows the operator 170 to define various parameters which, via the configuration module 162, govern the operation of the event acquisition functionality 142 and the tracking functionality 160. Another series of UI presentations allow the operator 170 to specify what kinds of reports they wish to receive (e.g., by specifying a time period of interest and resources of interest). The reporting module 168 then furnishes the requested reports to the operator 170 via various UI presentations. In generating the reports, the reporting module 168 can convert channel information expressed in the native format of the event acquisition functionality 142 (such as a format which identifies the channels by source IDs), to another format for output in the report (such as a format which provides channel call letters, channel source name, and/or virtual channel number). As to these terms of art, consider a FOX television program which aired in the San Francisco Bay Area, on channel 2 (KTVU); the call letters are KTVU, the channel source name is FOX, and the virtual channel number is 2.

Later sections in this disclosure provide additional details regarding the configuration module 162, the calculation module 164 and the report module 168.

The various functional features of the head-end functionality 102 can be implemented in different ways, such as by a collection of servers (not shown) allocated to different tasks. The servers can be co-located or can be provided at different physical sites. The storage units shown in FIG. 1 can be implemented using any suitable storage mechanisms, such as solid state storage, magnetic storage, optical storage, and so forth. Any database management functionality can be used to interact with the stores, and to manage the records in the stores (such as SQL).

A.2. Exemplary Composition of a Device

Figure 2:
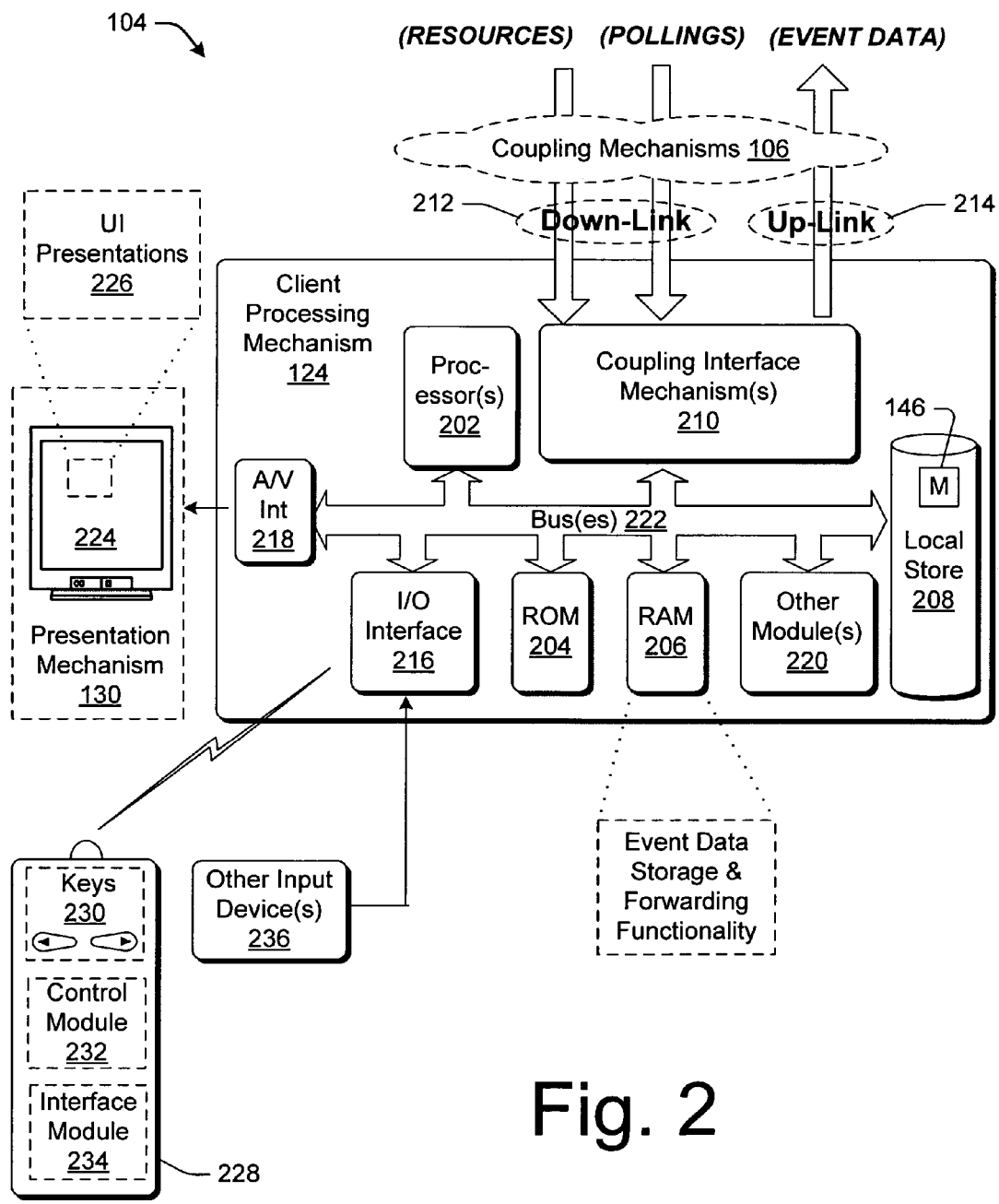
FIG. 2 shows a device for use in the system of FIG. 1.

FIG. 2 provides further details regarding one implementation of the representative device 104. Other devices (e.g., 106, ... 108) can share a similar composition. The device 104 includes client processing mechanism 124 and associated presentation unit 130. As mentioned above, the processing mechanism 124 can be implemented as a set-top box or functionality integrated with the presentation device 130 itself. Or the processing mechanisms 124 can be implemented as any other application-specific unit (such as a game console, e.g., the Xbox™ game console produced by Microsoft Corporation of Redmond, Wash.). Or the processing mechanism 130 can be implemented by a general purpose computer device, and so forth. In any case, the processing mechanism 124 can include one or more processors 202 for executing machine readable code, ROM memory 204 and RAM memory 206 for storing machine readable code and other data, and a local store 208 for storing any data of a more permanent nature than RAM 206. The processing mechanism 124 can also include one or more coupling interface mechanisms 210 for interacting with the head-end functionality 102 via one or more communication links (212, 214), an I/O interface 216 for interacting with one or more user input devices, an audio-visual (A/V) interface 218 for interacting with the presentation device 130, and various other optional modules 220. One or more busses 222 couple all of the above-identified components together and coordinate their cooperation.

The logic functionality used to report and process event data can be spread through the system 100 (of FIG. 1). In one implementation, the client processing mechanism 124 can include at least logic that enables the client processing mechanism 124 to receive polling messages from the polling module 144 and to respond to these polling messages by forwarding event data stored in memory 146 to receiving module and filtering 156. The client processing mechanism 124 can provide this logic with code stored in RAM 206, local store 208, or elsewhere. As shown in FIG. 2, the local store 206 can also provide the local event store memory 146. In preferred implementations, the head-end functionality 102 (such as the data acquisition functionality 142 and the tracking functionality 160) provides the bulk of the remaining code used to process event data. This helps reduce the cost and complexity of the devices (104, 106, ... 108), which are distributed to a large pool of users. However, it is also possible to delegate event processing functions to the devices (104, 106, ... 108). For instance, the devices (104, 106, ... 108) can provide filtering functionality which removes or modifies event data based on the above-described thresholds. In cases where the devices (104, 106, ... 108) implement aspects of event processing, code implementing this functionality can be stored in the RAM 206 and executed by the processor 202.

The presentation unit 130 is shown in FIG. 2 as a television set 224, although the presentation unit 130 can also be implemented as a stereo output system, or some other kind of media output device. In other cases, the presentation unit 130 can represent a combination of different output devices working in cooperation to present media resources. The processing mechanism 124 can be configured to present one or more UI presentations 226 to assist a user in interacting with the services provided by the head-end functionality 102. Such interface presentations 226 can be presented as overlay screens that overlay a television program or movie that the user happens to be watching.

A remote controller 228 serves as one possible input device for interacting with the client processing mechanism 124. As generally shown in FIG. 1, the remote controller 228 includes a collection of keys 230, a control module 232 for processing the user's actuation of the keys 230 to provide user instructions, and an interface module 334 for transmitting the user's instructions to the processing mechanism 124 via wireless communication (e.g., infrared communication).

A number of other input devices 236 can be used to interact with the services provided by the head-end functionality 102, in addition to, or as substitute for, the remote controller 228. For example, the other input devices 236 can represent a keyboard, a mouse-type input device, a joystick, and so on. Alternatively, or in addition, a user can use a separate computer device (such as a general purpose computer, a laptop computer, etc.) to enter commands to the head-end functionality 102.

FIG. 2 shows that there is a two-way exchange between the client processing mechanism 124 and the head-end functionality 102. Namely, a path 212 can be used to receive resources from the head-end functionality 102, such as television programs, movies, games, and so forth. Path 212 can also be used to receive polling messages from the polling module 144. Path 212 thus defines a down-link channel. In addition, a path 214 can be used to transfer event data from memory 146 to the receiving and filtering module 156. This path 214 defines an up-link channel. In terms of physical implementation, the paths can correspond to separate channels. For example, path 212 can correspond to a cable link, IP link, wireless satellite link, or other kind of communication path for delivering media resources and polling messages. Path 214 can correspond to a separate dedicated line (such as a telephone line) for transmitting event data to the head-end. In another implementation, path 212 and path 214 can be implemented using the same physical communication mechanism. For instance, in a DSL service, the same physical DSL functionality can be used to receive resources from the head-end functionality 102 and to exchange control information with the head-end functionality 102. Still other implementations are possible, encompassing any type and combination of communication channels.

The coupling interface mechanisms 210 can be physically implemented as any kind and combination of interface mechanisms, such as one or more tuners, a broadband connectivity mechanism, any kind of modem, and so forth.

B. Exemplary Method of Operation

B.1. Overview of Operation

Figure 3:
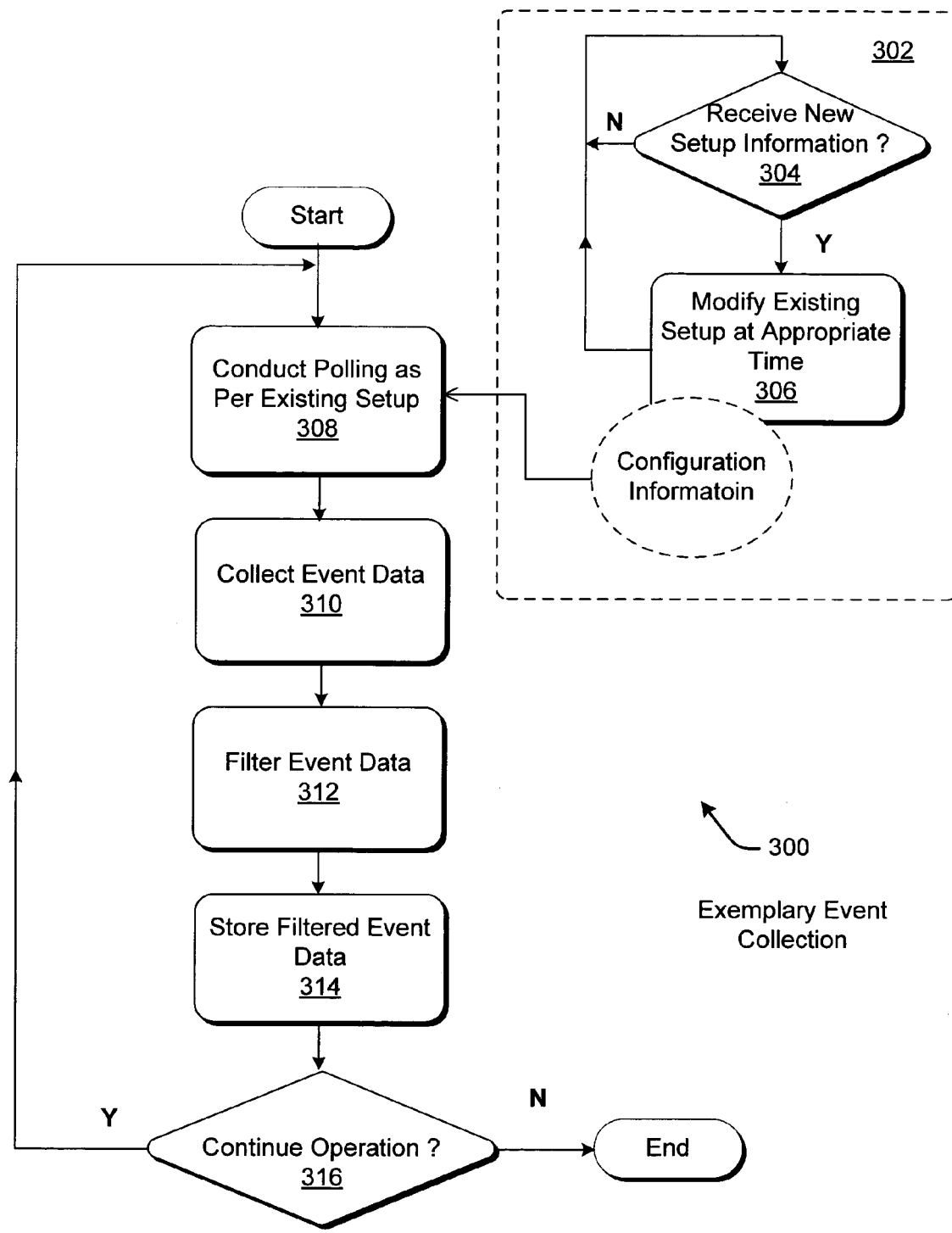
FIG. 3 shows an exemplary procedure for collecting event data.
Figure 6:
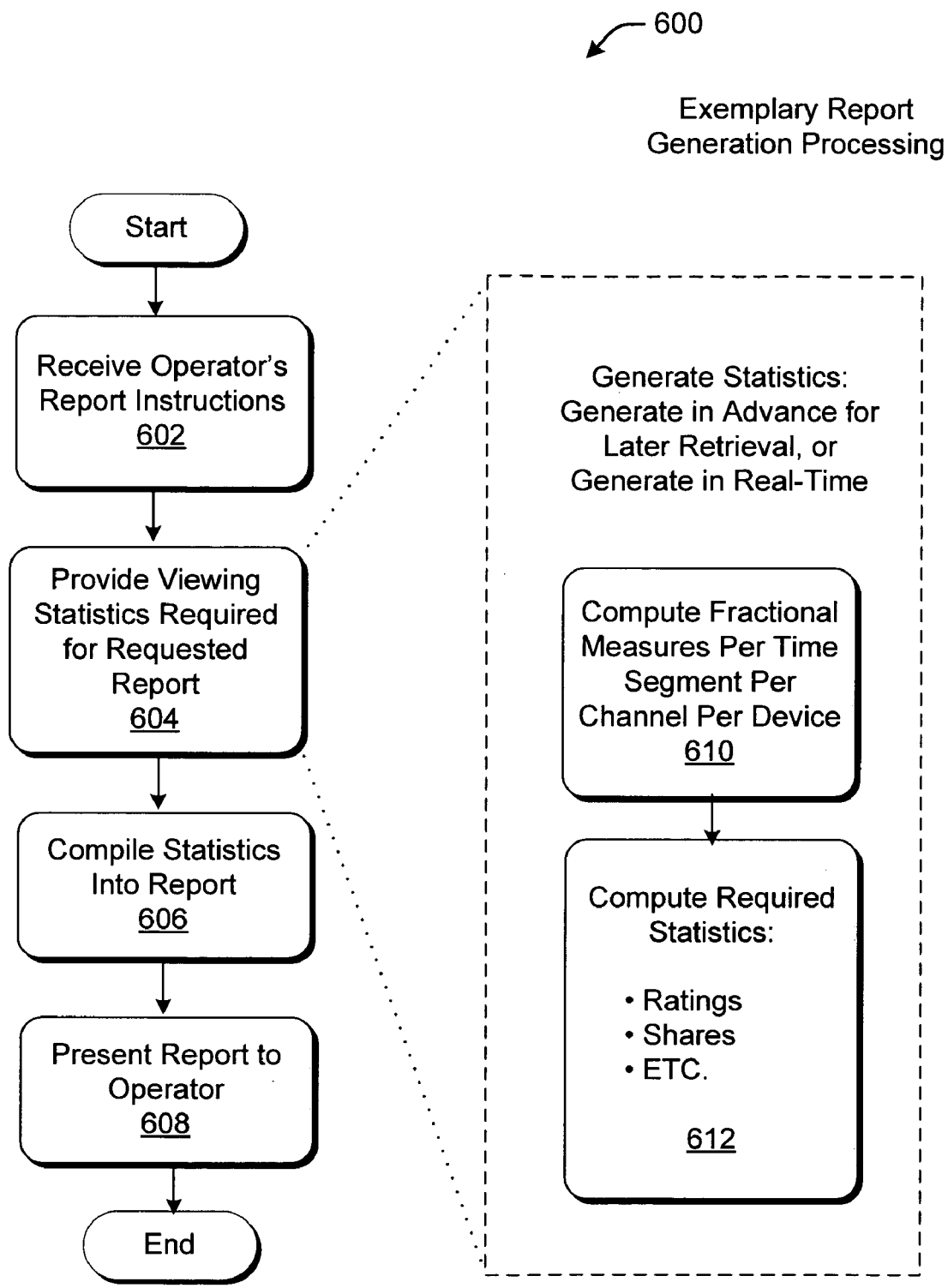
FIG. 6 shows an exemplary procedure for forming reports based on collected event data.

FIGS. 3 and 6 describe the operation of the system 100 of FIG. 1 in flow chart form. To facilitate discussion, certain operations are described as constituting distinct steps performed in a certain order. Such implementations are exemplary and non-limiting. Certain steps described herein can be grouped together and performed in a single operation, and certain steps can be performed in an order that differs from the order employed in the examples set forth in this disclosure.

To begin with, FIG. 3 shows a procedure 300 for collecting event data from the devices (104, 106, ... 108). The procedure includes a sub-procedure 302 for defining configuration information. The configuration information governs the operation of the procedure 300 for collecting events. Step 304 of this sub-procedure 302 involves determining whether new configuration has been defined. Step 306 involves modifying the existing information at an appropriate time to take account for the new configuration information. For instance, subroutine 302 can involve generating new sampling lists. The configuration module 162 generates a random list by culling a random sample of devices from an entire pool of available devices defined by the registration module 152. The configuration module 162 processes custom lists received by the operator 170 by validating the custom lists in a two-stage process. One stage involves determining whether the devices identified in the list exist and are available for polling (by consulting the registration module 152). Another stage involves determining whether the custom list conforms to a pre-defined schema. Sub-procedure 302 can also involve defining various timing parameters which govern the operation of the tracking functionality 160 and the event acquisition functionality 142. For instance, the operator 170 can define timing at which polling commences and is thereafter performed, the timing at which events are retrieved from the event store 158, the timing at which new sampling lists are propagated to polling module 144, and any other facet of the operation of the head-end functionality 102.

In the main body of the procedure 300, a step 308 conducts a polling operation based on the configuration information provided in sub-procedure 302. In this step (308), the polling module 144 polls the devices (104, 106, . . . 108) identified in the random list or custom list, sending these devices (104, 106, . . . 108) a polling message. Prior to being polled, the devices (104, 106, . . . 108) have been delivering resources to the users (136, 138, . . . 140) and storing any event data, in their respective memories (145, 148, . . . 150), associated with the users' consumption of these resources. Event data can describe device turn-on events, device turn-off events, channel change events, and any other kind of events. The devices (104, 106, . . . 108) respond to the polling messages by forwarding any new events stored in the memories (146, 148, . . . 150). In step 310, the receiving module 154 collects the events forwarded by the devices (104, 106, . . . 108). The procedure 300 can vary the polling and event collection operation in any number of ways. For instance, the devices (104, 106, . . . 108) can independently forward event data to the event acquisition functionality 142 (e.g., without being prompted to do so by the event acquisition functionality 142).

Figure 4:
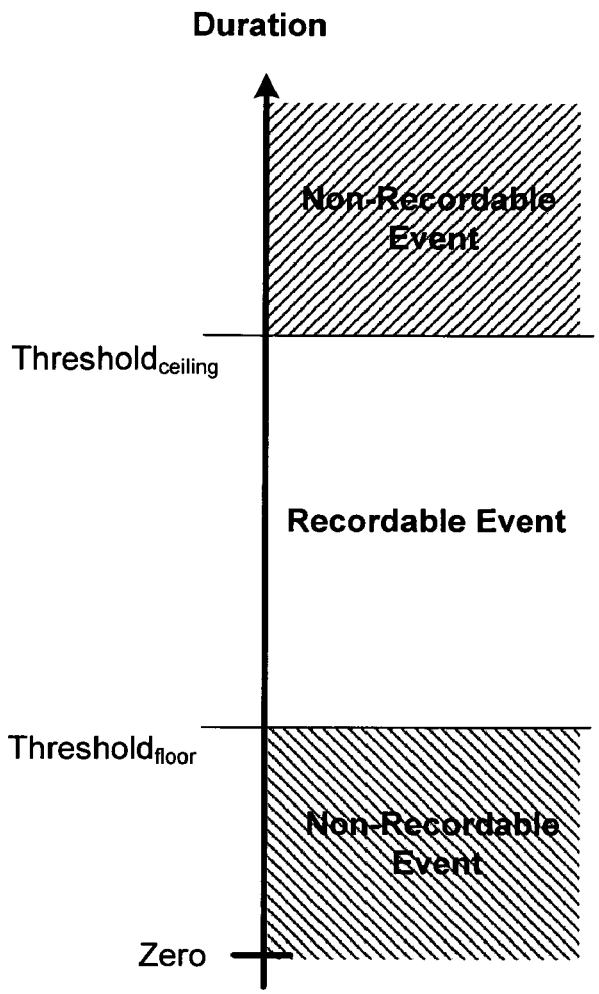
FIG. 4 illustrates the concepts of an upper-bound threshold and a lower-bound threshold, which together are used to omit or modify certain event data.

In step 312, the receiving and filtering module 156 acts to remove or modify certain event data that does not represent the legitimate consumption of resources. As previously described, the receiving and filtering module 156 removes events of brief duration, which can represent rapid "channel surfing" behavior exhibited by the user. The receiving and filtering module 156 also truncates events of particularly long duration, which can indicate that the user may not be actively attending to the resource (because the user has fallen asleep, left the room, and so forth). FIG. 4 illustrates the exclusion and modification of event data in the above-described manner. With reference to this figure, to summarize, the receiving and filtering module 156 excludes events beyond a lower-bound floor and truncates events above an upper-bound ceiling (by assigning these long events durations that are equal to the upper-bound threshold). The receiving and filtering module 156 can store event data having durations that fall between the two thresholds without modification.

Figure 5:
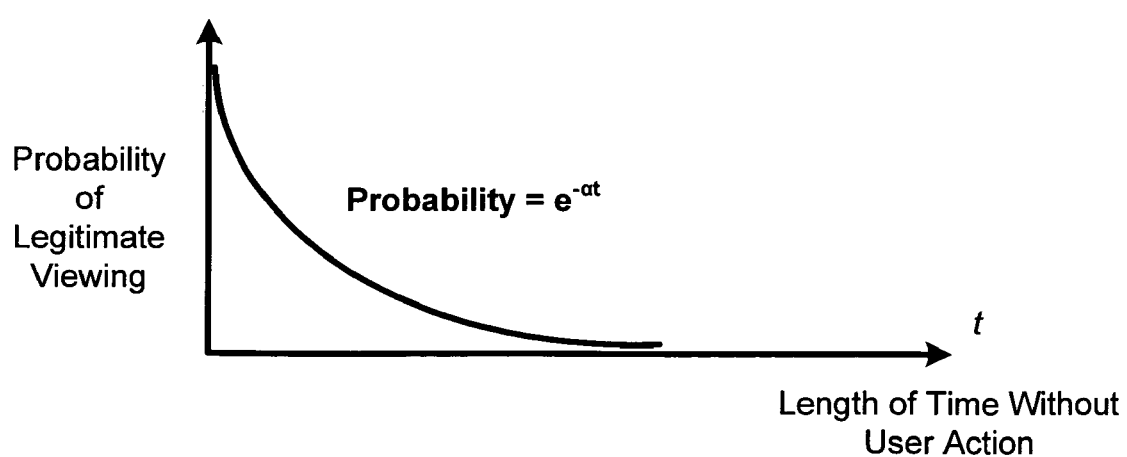
FIG. 5 shows a weighting curve used to define the probability, as a function of the duration of an event, that an individual has actually consumed a particular resource.

Instead of applying a binary upper-bound ceiling threshold, the receiving and filtering module 156 can assign a weight to the event data which reflects the probability that the event data represents a legitimate consumption of resources. FIG. 5 illustrates one such weighting function that assigns weights to event data:

$$\text{Probability} = e^{-\alpha t}$$

where:
Probability represents a weighting value or score that reflects the probability of legitimate consumption;
t represents the duration associated with the event; and
α represents a constant, which can be empirically selected to provide accurate weights based on prior testing and observation.

As shown in FIG. 5, the probability of an event representing a legitimate consumption of resources can decrease as the event duration t increases (that is, as the duration of the event increases without the receipt of an input action from the user that indicates that the user is engaged in consuming the resource). For instance, the curve can effectively fall off to 0 after some configurable amount of time (e.g., in one exemplary and non-limiting case, 2 or 3 hours). (Although not depicted in FIG. 5, events of particularly short duration can be excluded because they fail to meet the lower-bound floor threshold described above.) The decaying exponential weighting curve is merely illustrative; the receiving and filtering module 156 can apply other kinds of modeling functions that accurately represent the probabilities of legitimate resource consumption. For instance, in another case, the curve profile can have a stair-step-like shape. That is, the shape can be flat for each 30 minute segment, while decreasing at the end of each segment in the manner of descending stairs.

In operation, the probability weights can by applied to the event data by multiplying the probability weights by the duration values to appropriately offset the duration values. Consider the exemplary case where the event data indicates that a user has consumed a particular resource for the entirety of a time segment (e.g., 30 minutes). But also suppose that the collected event data reveals that the user has been tuned to the particular channel (e.g., a particular resource) for an extended period of time (such as 10 hours). This might probabilistically indicate that the user might not have actually consumed all of the resource in the 30 minute segment under consideration, despite having been tuned to it. Assume, that the probability weight in this case is 0.2 (as determined by applying the probability curve), indicating that there is only a 20% probability the user has consumed the resource during the 30 minute segment. This weighting factor can be applied to the event data by multiplying the weighting factor by the duration (e.g., 0.2×30 minutes) to yield an "effective" or "offset" duration of 6 minutes.

Generally, this discussion has described the filtering operations as being performed by the filtering module 156. However, as previously mentioned, the filtering operation of step 312 can be performed by other entities in the system 100 besides the receiving and filtering module 156. For instance, the devices (104, 106, . . . 108) themselves can apply the filtering operation to the events that they detect, thereby excluding certain events before they even reach the head-end functionality 102.

In step 314, the event acquisition functionality 142 stores the filtered event data in the event store 156.

In step 316, the head-end functionality 102 determines whether the event collection procedure 300 should continue. In the case that this procedure 300 is de-activated, the procedure 300 terminates; otherwise it continues.

FIG. 6 shows a procedure 600 for providing reports to the operator 170 which contain resource consumption statistics. In step 602, the operator 170 specifies the nature of the report which he or she would like to receive by defining various features of the report. One such feature defines the type of statistical information to be provided in the report (e.g., rating information, share information, etc.). Another definable feature specifies the time span covered by the report, such as particular months, weeks, days, hours, fractions of an hour, and so forth. Another definable feature of the report specifies the type of resources that the operator 170 wishes to examine. For instance, the operator 170 may wish to examine only certain channels, certain groups of channels, certain resources that aired on certain channels, and so forth. These features are illustrative, rather than exhaustive of the kind of properties that that the operator 170 may define. In any of the above-described cases, the operator 170 can input his or her selections via the control module 172, which can be coupled to the report module 168 via an intranet or other coupling mechanism 174.

Step 604 involves providing statistics that satisfy the requirements specified by the operator 170. The tracking functionality 160 can perform this task in two manners. In one case, the calculation module 164 can, in advance of specific requests from the operator 170, pull event data from the event store 158 and perform various statistical calculations on this event data. The calculation module 164 can store the resultant statistical calculations in the statistics database 166. Then, when the operator 170 makes a specific request, the report module 168 can cull a subset of statistical calculations from the statistical database 166. In another case, the calculation module 164 can perform real-time calculations when the operator 170 requests a report by performing calculations "on-the-fly" based on the raw event data stored in the event store 158.

In step 606, the reporting module 168 compiles the culled statistics into a report format that meets the specified requirements of the operator 162.

In step 608, the reporting module 168 presents the compiled report to the operator 170 for his or her inspection. As will be described with reference to FIG. 8 below, the report module 168 can provide the report in the form of a graphical user interface presentation. However, the report module 168 can output the report in other forms, such as a printed report, and so forth.

B.2. Calculation of Statistics

The right-hand portion of FIG. 6 provides an overview of one technique for computing consumption statistics based on the event data pulled from the event store 158. By way of overview, in step 610, the calculation module 164 computes the fractional consumption measures ("fractional measures") that reflect the users' consumption of resources. In step 612, the calculation module 164 uses these fractional measures to compute statistics of interest, such as rating information and share information. The following discussion provides details regarding these two steps.

Starting with step 610, the calculation module 164 can collect event data from the event store 158 on any periodic basis, such as daily. The calculation module 164 then proceeds to perform statistical calculations based on the event data. In one exemplary implementation, the calculation module 164 can perform the calculations for different permutations of channels, time spans and devices. As to channels, the calculation module 164 performs the calculations for every channel identified in a source map. (The operator 170 can provide the source map to the tracking functionality 160. The source map identifies channels that have been provided to the users (136, 138, . . . 140) and also provides information which allows the tracking functionality 160 to convert from one way of identifying channels to other ways of identifying channels, e.g., from source ID numbers to virtual channel numbers). As to time span, the calculation module 164 divides a reporting time span into a plurality of time segments and performs separate calculations for each time segment. In one exemplary and non-limiting case, the calculation module 164 performs calculations for every 30 minute time segment. As to devices, the calculation module 164 performs calculations for all in-tab devices (104, 106, . . . 108). "In-tab" devices refers to devices that have responded to polling messages.

To compute the fractional measure with respect to a particular device and a particular channel, the calculation module 164 measures the number of minutes that the device was tuned to the channel (subject to the rules imposed by the receiving and filtering module 156) and then divides this value by 30 minutes (the length of the exemplary time segment). More formally, for each device i, for each channel, and for a particular half-hour time segment:

$$F_i = T_i / T_{seg\_total}$$

where:

$F_i$ is a fractional measure that reflects how long a user has viewed a channel on device i during a particular half-hour segment;

$T_i$ is the duration (in minutes) that device i has been tuned to the channel; and $T_{seg\_total}$ is the entire duration (in minutes) of the time segment, such as 30 minutes in the examples set forth herein.

The result of step 610 is thus a plurality of $F_i$ values corresponding to different devices i, different time segments, and different channels.

Step 612 uses these fractional measures to calculate different statistical measures. One such statistical measure is rating information. Ratings generally refer to the percentage of devices (104, 106, . . . 108) tuned to a channel during a particular time segment, relative to an entire pool of devices that can consume resources. In the particular case of this disclosure, rating information is computed by summing the individual device half-hour segment results ($F_i$) over all in-tab devices (104, 106, . . . 108) and dividing the result by the total number of in-tab devices (104, 106, . . . 108). The resulting rating value constitutes the percentage of in-tab devices (104, 106, . . . 108) that were tuned to a particular channel during a particular half-hour segment. More formally, rating information can be computed using the following equation:

$$ChRatePer = \frac{1}{N} \sum_{i=1}^{N} F_i$$

where:

ChRatePer is the channel rating for the half-hour segment;

$F_i$ is a fractional measure that reflects how long a user has viewed a channel on device i during a particular half-hour segment;

N is the total number of in-tab devices (104, 106, . . . 108). The N value can be obtained from the event acquisition functionality 142, which collects and stores this value as a result of its polling activities.

A number of other statistical measures can be calculated. For instance, the calculation module 164 can also compute a report ratings sum. This measure is computed by tallying the individual ratings for each channel specified in a report. More formally, this measure can be computed by:

$$ChRateSumPer = \sum_{ch=1}^{M} ChRatePer_{ch}$$

where:
ChRateSumPer is the sum of the channel ratings (ChRatePer) for all channels in the report;
M is the total number of channels in a particular report, which can represent a subset of the total number of channels for which event data has been collected; and
$ChRatePer_{ch}$ is the individual rating for each channel in the report for a half-hour segment.

The calculation module 164 can also compute a total ratings measurement. Namely, for all the channels in the source map and for a half-hour segment, the calculation module 164 determines the total ratings measurement by summing the individual ratings for each channel in the source map. This is the total percentage of in-tab users consuming resources. More formally, the following equation sets forth how the total ratings measurement can be computed:

$$ChRateTotalPer = \sum_{ch=1}^{Z} ChRatePer_{ch}$$

where:
ChRateTotalPer is the aggregate of ChRatePer measures for all channels in the source map for a half-hour segment;
Z is the total number of channels in the source map; and
$ChRatePer_{ch}$ is the channel rating for each channel in the source map for a half-hour segment.

The calculation module 164 can also use the probability information to calculate share information. Shares are generally a measure of the number of users consuming a particular channel relative to those who are actually consuming resources. In the context of this disclosure, for a half-hour segment and for a particular channel, the per-channel share is equal to the total number of users tuned to the channel divided by the total number of users tuned to all channels. The total number of viewers on the channel is equal to the device half-hour segment viewing probability, and the total number of users tuned to all channels can be calculated as the total ratings measurement multiplied by the number of in-tab devices. More formally, share information can be computed using the following equation for each half-hour segment and for each channel in the source map:

$$ChSharePer = \left\{ \frac{1}{N \times ChRatetotalPer} \right\} \times \sum_{i=1}^{N} F_i$$

where:
ChSharePer is the channel share for the half-hour segment;
$F_i$ is a fractional measure that reflects how long a user has viewed a channel on device i during a particular half-hour segment;
N is the total number of in-tab devices (104, 106, . . . 108); and
ChRateTotalPer is an aggregation of ChRateTotal measures (defined above) for a half-hour block.

A number of other statistical measures can be calculated pertaining to share. For instance, the calculation module 164 can also compute a report shares sum. The calculation module 164 computes the report shares sum by tallying the individual shares for each channel in a particular report. More formally, the report shares sum can be computed using the following equation:

$$ChShareSumPer = \sum_{ch=1}^{M} ChSharePer_{ch}$$

where:
ChShareSumPer is the sum of the channel shares for all channels in a particular report for a half-hour block;
M is the total number of channels in the report; and
$ChSharePer_{ch}$ is the individual share for channel ch in the report for a half-hour block.

The calculation module 164 can also compute a total shares measurement. Namely, for all the channels in the source map and for a half-hour segment, the calculation module 164 determines the total shares measurement by summing the individual shares for each channel in the source map. This is the total percentage of in-tab users consuming resources who are consuming resources, which should thus yield 100% by definition. More formally, the following equation sets forth how the total shares measurement can be computed:

$$ChShareTotalPer = \sum_{ch=1}^{Z} ChSharePer_{ch}$$

where:
ChShareTotalPer is the sum of channel shares over all channels in the source map for a half-hour block;
Z is the total number of channels in the source map; and
$ChSharePer_{ch}$ is the individual share for channel ch in the report for a half-hour block.

C.3 Exemplary Applications of the Statistics

The statistics provide insight into the number of users who are consuming resources at particular times of the day. This information is useful for a number of reasons. This subsection summarizes exemplary uses of the statistics information.

In one use, an operator can use the statistics information to optimize channel line-up. Channel line-up defines the ordering of channels provided to users. An operator might want to group more popular resources on lower channels in the line-up in order to keep users who might be tuned to one of these channels "in the proximity" of other popular channels. This helps create a better user experience for the majority of users. More specifically, aggregating popular channels together allows a user to tune from one popular channel to another by simply activating the channel up/down command button on the remote controller 228, rather than having to make more burdensome large jumps within the channel line-up. An operator may also wish to investigate the effects of channel line up on ratings and shares by moving a particular channel to a popular cluster of channels and noting any change in ratings and shares for that particular channel.

In another use, an operator can use the statistics information to negotiate network carriage rates. More specifically, an operator may pay or may charge a television network for carriage depending on the particular network. In either case, the operator can use the relative rating of a particular television network to better compute a value for carriage. In the case where a television network charges an operator for carriage, the operator can negotiate the price they pay for carrying the network based on the channel rating. In the case where an operator charges a television network for carriage, the operator can negotiate a higher price for carriage based on television network ratings that are higher than anticipated.

In another use, an operator can use the statistics information to influence programming selections. In one scenario, an operator may sell television program tracking information to television networks that, in turn, can use this information to prioritize and schedule television programming in order to optimize consumer exposure. In another similar scenario, an operator may be owned by a parent company that also has interests in one or more television networks. The television network company may request television program tracking information from the operator in order to prioritize and schedule television programming in order to optimize consumer exposure.

In another use, an operator can use the statistics information to determine the cost of advertisements (Ad CPMs). Namely, the price an operator can charge for running advertisements (CPM) is generally proportional to the number of consumers who will see the advertisements. The above-described statistics allows the operator to have better insight into the number of users viewing resources, which may allow the operator to more successfully negotiate favorable CPMs.

The above examples are merely illustrative of a wide range of uses of the statistics information.

C. Exemplary User Interface Functionality

Figure 7:
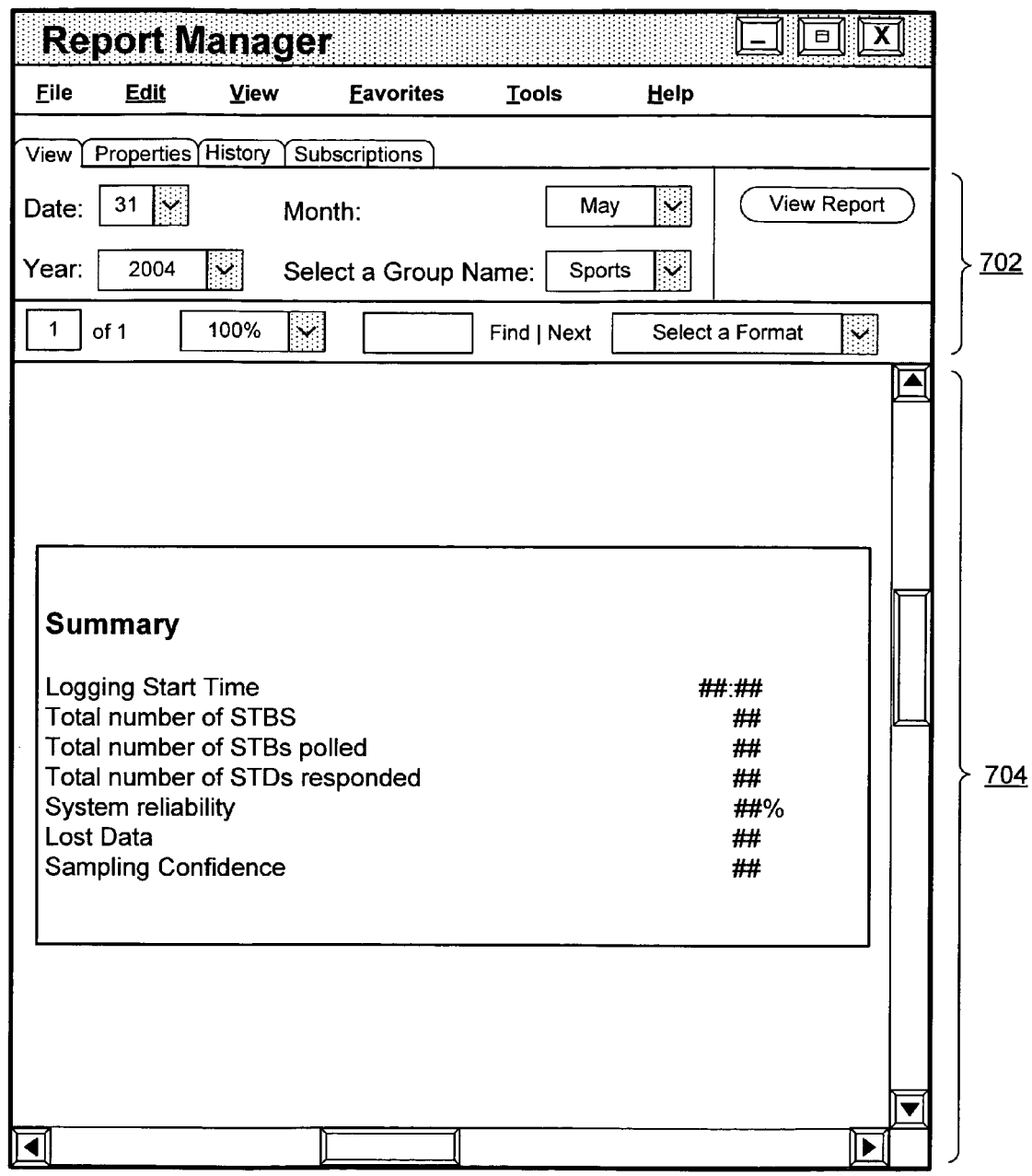
FIG. 7 shows an exemplary user interface (UI) presentation that provides a summary-type report.
Figure 9:
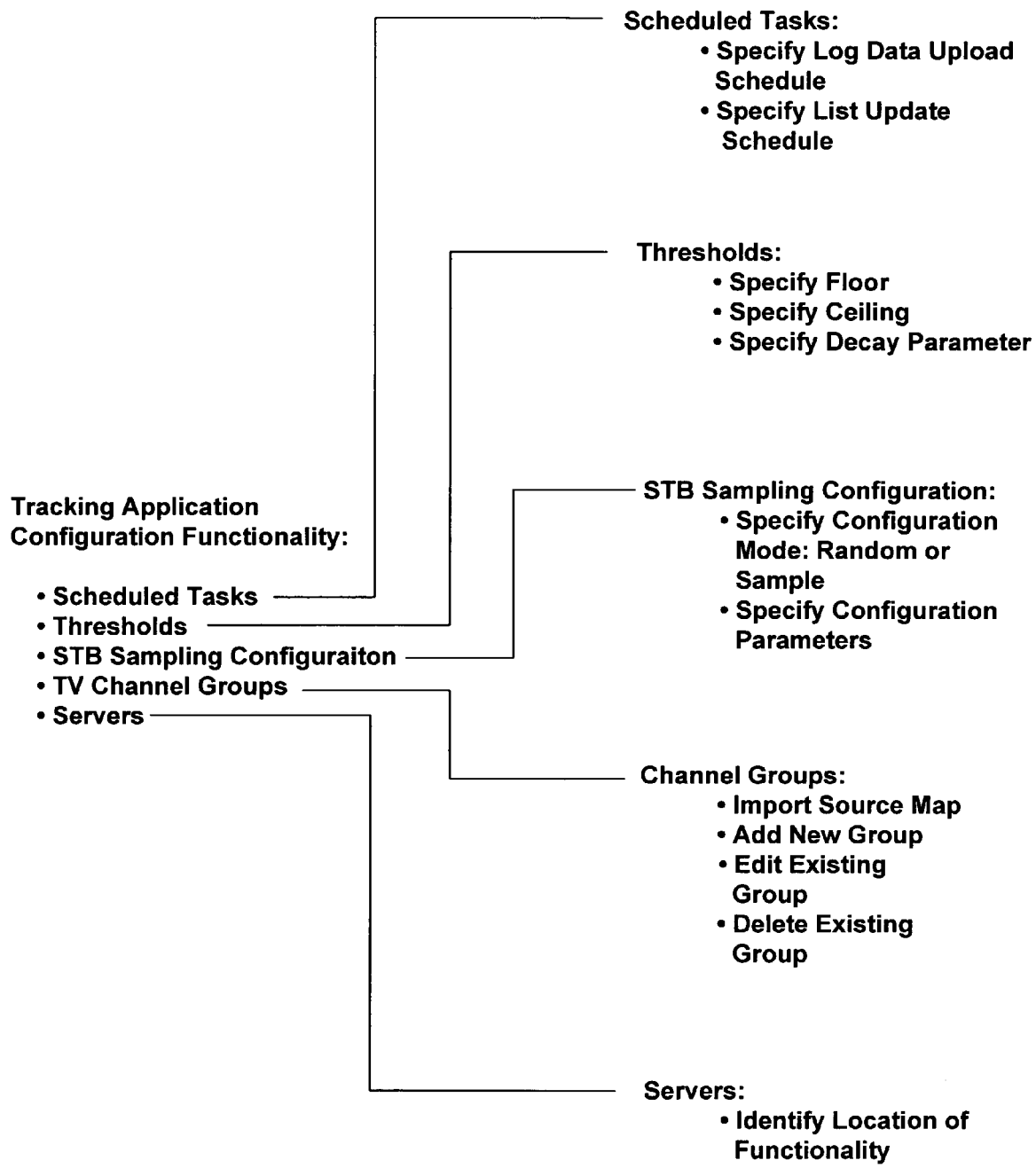
FIG. 9 shows an outline summary of configuration functionality that can be provided by the system of FIG. 1 via a collection of UI presentations.

FIGS. 7-9 show various UI functionality furnished by the reporting module 168 to the operator 170 via the control module 172. Namely, FIGS. 7 and 8 show two user interface (UI) presentations that provide statistics calculated by the calculation module 164. FIG. 9 provides an outline of configuration information that can be input to the configuration module 162 via appropriately configured UI presentations. Although a preferred method of interacting with the operator 170 is via UI presentations, the report module 168 can use other mechanisms for interacting with the operator 170. For instance, the report module 168 can generate printed reports that provide the requested consumption statistics.

To begin with, FIG. 7 shows a first UI presentation 700 that provides a summary of sampling conditions associated with a particular collection of sampled data. The UI presentation 700 includes two main sections (702, 704). The first main section 702 provides an interface which allows the operator 170 to define the aspects of the report that they wish to receive.

For instance, the first section 702 allows the operator 170 to identify a channel group (wherein the channel groups can be created in the manner to be described below). The channel group identifies a collection of channels for which statistics will be provided. In the example of FIG. 7, the operator 170 has selected a "Sports" group, meaning that the operator 170 has instructed the reporting module 168 to generate statistics for a collection of sports-related channels. Alternatively, the operator 170 may select an "All Channels" group, meaning that the operator 170 has instructed the reporting module 168 to generate statistics for all channels identified in the source map. As will be described below, the configuration module 162 allows the operator 170 to define groups by specifying group names and by specifying the channels which compose the groups. Other groups (such as the "All Channels" group) are preconfigured by the tracking functionality 160, and cannot be edited by the operator 170. Section 702 also allows the operator 170 to select the time period against which a report will be generated. The operator 170 can specify a time period by inputting year, month, date, and so forth. In the example of FIG. 7, the operator 170 has instructed the reporting module 168 that he or she wishes to view consumption statistics for the day of May 31, 2004.

The second section 702 of the report 700 provides various summary information which identifies the conditions under which sampling took place on May 31, 2004. A first entry in section 704 provides the total number of devices (104, 106, . . . 108) that were active on the report date. A second entry in section 704 provides the total number of devices (104, 106, . . . 108) that were polled by the polling module 144. A third entry in section 704 provides the total number of devices (104, 106, . . . 108) that responded to the polling messages. A fourth entry in section 704 provides a measure of system reliability. Reliability can be calculated as the total number of devices that responded divided by the total number of devices polled, the result of which is multiplied by 100. A fifth entry in section 704 identifies a measure of lost data. This measure provides some indication of whether the event data collected on the report date may be incomplete for any identified reason. For instance, a device may have overrun the capacity of its memory for storing event data, therefore resulting in a failure to fully capture the behavior of the user during a particular reporting interval. A sixth entry in section 704 identifies sampling confidence. The operator 170 can specify the sampling confidence, which defines, in part, the level of certainty in the calculated consumption statistics. Generally, the data used to fill in section 704 can be provided by the event acquisition functionality 142, which collects and stores this data in the normal course of its polling operation. (In the particular case of sampling confidence, this information is reported when a random list is submitted, rather than a custom sample list. The system calculates the random sample poll size based on the desired confidence specified by the operator when configuring the tracking functionality. This sampling confidence is reported in FIG. 7.)

FIG. 8 shows another UI presentation 800 that provides actual consumption statistics corresponding to the devices (104, 106, . . . 108) polled under the conditions set forth above. Like UI presentation 700, the UI presentation 800 includes two sections (802, 804). The first section 802 contains the same fields of information as the first section 702 of the UI presentation 700. Like the case described above, the operator 170 has made selections that indicate that he or she wishes to view consumption statistics for sports channels for the day of May 31, 2004.

The second section 804 of the report presents statistics for the operator-selected time frame and resource group (May 31, 2004, and Sports grouping). Namely, a first column of the report defines a plurality of channels contained within the specific sports group. The horizontal axis of the chart defines a plurality of successive time segments of one-half hour duration each (in this exemplary and non-limiting case). The entries within the chart itself provide statistics for each of the channels for each of the half-hour segments. In one case, the statistics can pertain to rating information. In another case, the statistics can pertain to share information. In other words, entries with the main portion of the chart can correspond to the ChRatePer or ChSharePer measurements defined in Section B.2 (above). The "Sum" row aggregates the statistics measurements in each column of the chart. More specifically, the "Sum" row can correspond to the ChRateSumPer or ChShareSumPer measurements defined in Section B.2. The Sum measurements are report-specific aggregations. On the other hand, the "Total" row aggregates the statistics measurements for an entire set of channels identified in the source map (that is, not simply the channels in the selected resource group). More specifically, the "Total" row can correspond to the ChRateTotalPer or ChShareTotalPer measurements defined in Section B.2.

The contents and format of the UI presentations shown in FIGS. 7 and 8 are merely illustrative; the reporting module 168 and the calculation module 164 can provide and present additional kinds of statistics.

FIG. 9 summarizes UI functionality that can be used by the operator 170 to interact with the configuration module 162. Namely, this UI functionality allows the operator 170 to define configuration information that will govern the operation of the tracking functionality 162 and the event acquisition functionality 142. This UI functionality can be implemented as a series of UI presentations (not shown) that prompt the operator 170 to enter such configuration information.

The UI functionality shown in FIG. 9 can be grouped into five main categories. The reporting module 168 can allow the operator 170 to access any one of these categories by presenting a UI menu control which lists these five categories.

A first category is referenced to as "Scheduled Task." This category can allow the operator 170 to specify the start date and the time of day when the tracking functionality 160 receives event data from the event store 158, and the frequency at which it will perform this task thereafter. This category can also allow the operator 170 to specify the start date and time when the tracking application 160 generates a new sampling list and provides the new list to the polling module 144, and the frequency at which this task is performed thereafter.

A "Thresholds" category allows the operator 170 to specify a lower-bound floor threshold, an upper-bound ceiling threshold, and the α parameter used in the exponential weighting curve. These parameters govern the operation of the receiving and filtering module 156, as discussed above.

A "STB Sampling Configuration" category allows the operator 170 to specify whether the polling module 144 is to perform polling using a random sample list or a custom sample list. This category also allows the operator 170 to specify various parameters that govern the sampling operation. For the case of random sampling, this category allows the user to specify a confidence level and a confidence interval. The configuration module 102 can use this information to calculate the size of the sampling set (because a certain sampling size will be required to satisfy these confidence parameters). In one case the size of the sample is defined as:

$$SampleSize = \frac{Z^2 \times p \times (1-p)}{c^2}$$

where:
SampleSize refers to an ideal sample size required to achieve an operator-specified confidence level and confidence interval;
Z denotes the confidence quotient (e.g., for a 95% confidence, Z is 1.96 and this value is obtained from standard Z tables that characterize Z distribution functions);
p refers to an empirically derived value required to achieve a defined confidence level (in one exemplary case, p can be set to 0.5, as it can be assumed that, in a half-hour block, across an infinite population of users watching a channel, the average time spent by a user is 15 minutes; and c refers to the selected confidence interval.

The actual population size is not infinite, so the analysis should account for the actual population size. To this end, the SampleSize value can be adjusted to account for actual sampling conditions using the following equation:

$$AdjustedSampleSize = \frac{SampleSize}{(1 + ((SampleSize - 1)/Population))}$$

where:
SampleSize refers to the ideal sample size; and
and Population refers to the actual size of an entire population of devices.

For the case of a custom sample list, the STB Sampling Configuration category allows the operator 170 to load a specified file containing the custom list of devices (104, 106, . . . 108) to be sampled by the polling module 144.

A "TV Channel Groups" category allows the operator 170 to define and edit channel groups. Channel groups refer to collections of channels for which the reporting module 168 can generate reports. More specifically, a first function in this category allows the operator to import a source map. The source map defines an entire collection of channels for which the calculation module 164 generates statistics. The source map therefore identifies the group of channels in the "All Channels" grouping. The source map also defines the set of all available channels on the TV network. Another function in this category allows the operator 170 to add a new group. UI functionality can be provided to facilitate this task by allowing the operator 170 to define the name of the new group as well as its constituent channels. One particular UI presentation that can be used to allow the operator 170 to select channels in a listing of a plurality of channels, with check boxes displayed next to each channel listing. Using this tool, the operator 170 can specify the membership of the group by placing checks in checkboxes corresponding to the channels that the operator 170 wishes to include in the group. Another function provided by this category allows the operator 170 to edit or delete an existing group.

A "Servers" category allows the operator 170 to enter information regarding the network addresses of various components of the head-end functionality 102, so as to enable these components to interact with each other. For instance, the operator 170 may specify a Uniform Resource Locator (URL) which identifies the location of a server implementing certain aspects of the event acquisition functionality 142.

In closing, a number of examples have been presented in this disclosure in the alternative (e.g., case A or case B). In addition, this disclosure encompasses those cases which combine alternatives in a single implementation (e.g., case A and case B), even though this disclosure may not expressly mention these conjunctive cases in every instance.

More generally, although the invention has been described in the context of specific to structural features and/or methodological acts, it is to be understood that the invention defined in the appended claims is not necessarily limited to the specific features or acts described. Rather, the specific features and acts have been presented as exemplary strategies for implementing the claimed invention.

What is claimed is:

1. A method for generating statistical information that reflects the consumption of a resource, comprising:
collecting event data from a plurality of devices, wherein the event data identifies consumption behavior of respective users who operate the plurality of devices;

computing by a processor a measure of a user's consumption of the resource within a defined time segment by:
  identifying the amount of time that the user consumed the resource within the defined time segment including:
  assigning a weight to the collected event data which conveys the likelihood that the corresponding event represents a legitimate consumption of the resource, wherein the weight is defined using a weighting function having an exponentially decaying shape, and
  multiplying an amount of time determined by the event data by the weight to calculate the amount of time that the user consumed the resource;
  dividing the amount of time that the user consumed the resource by the total amount of time in the time segment, to provide a fractional consumption measure;
  repeating the computing of the measure for plural users and for plural time segments to provide a plurality of fractional consumption measures;
  generating statistical information on the basis of the fractional consumption measures; and
  transmitting a report that identifies the statistical information.

2. The method of claim 1, wherein the resource is a media resource.

3. The method of claim 2, wherein the resource is a television program disseminated by a television program dissemination system.

4. The method of claim 3, wherein the devices comprise set-top boxes coupled to respective television units.

5. The method of claim 1, wherein the generating of statistical information comprises generating rating information by computing an average of the fractional consumption measures for a particular time segment.

6. The method of claim 1, wherein the generating of statistical information comprises generating share information by computing the total number of users consuming the resource divided by the total number of users consuming any resources for a particular time segment.

7. The method of claim 1, further comprising filtering the event data to eliminate event data that represents a consumption event having a duration below a defined lower-bound threshold.

8. The method of claim 1, wherein the collecting of event data comprises polling the plurality of devices based on their membership in a sampling list.

9. The method of claim 8, wherein the sampling list is randomly generated.

10. The method of claim 8, wherein the sampling list is deterministically generated by an operator.

11. The method of claim 1, wherein the transmitting of the report comprises providing the report via a network to a remote operator or user.

12. One or more machine readable media including machine readable instructions for implementing the method of claim 1.

13. A system for generating statistical information that reflects the consumption of a resource, comprising:
  a processor;
  a storage device;
  event acquisition functionality configured to be operated by the processor and stored on the storage device for collecting event data from a plurality of devices, wherein the event data identifies consumption behavior of respective users who operate the plurality of devices; and
  tracking functionality configured to be operated by the processor and stored on the storage device for computing and reporting statistics based on the collected event data, the tracking functionality comprising:
    a calculation module configured to:
    compute a measure of a user's consumption of the resource within a defined time segment by: (i) identifying the amount of time that the user consumed the resource within the defined time segment, including:
      assigning a weight to the collected event data which conveys the likelihood that the corresponding event represents a legitimate consumption of the resource, wherein the weight is defined using a weighting function having an exponentially decaying shape, and
      multiplying an amount of time determined by the event data by the weight to calculate the amount of time that the user consumed the resource;
    and (ii) dividing the amount of time that the user consumed the resource by the total amount of time in the time segment, to provide a fractional consumption measure;
    repeat the computing of the measure for plural users and for plural time segments to provide a plurality of fractional consumption measures; and
    generate statistical information on the basis of the fractional consumption measures; and
  a reporting module configured to transmit a report that identifies the statistical information.

14. The system of claim 13, wherein the resource is a media resource.

15. The system of claim 14, wherein the resource is a television program disseminated by a television program dissemination system.

16. The system of claim 15, wherein the devices comprise set-top boxes coupled to respective television units.

17. The system of claim 13, wherein the calculation module is configured to generate statistical information in the form of rating information by computing an average of the fractional consumption measures for a particular time segment.

18. The system of claim 13, wherein the calculation module is configured to generate statistical information in the form of share information by computing the total number of users consuming the resource divided by the total number of users consuming any resources for a particular time segment.

19. The system of claim 13, wherein the event acquisition functionality comprises a filtering module for filtering the event data to eliminate event data that represents a consumption event having a duration below a defined lower-bound threshold.

20. The system of claim 13, wherein the event acquisition functionality includes a polling module configured to poll the plurality of devices based on their membership in a sampling list.

21. The system of claim 20, wherein the tracking functionality is configured to generate the sampling list by randomly selecting devices for inclusion in the sampling list.

22. The system of claim 20, wherein the sampling list is a custom sampling list provided by an operator, and wherein the tracking functionality is configured to validate the custom sampling list.

23. The system of claim 13, wherein the reporting module is configured to provide the report via a network to a remote operator or user.

24. One or more machine readable storage media storing machine readable instructions for implementing the functionality of claim 13.

25. A method for generating statistical information that reflects the consumption of a television program disseminated by a television program dissemination system, comprising:

collecting event data from a plurality of set-top boxes coupled to respective television units, wherein the event data identifies consumption behavior of respective users who operate the plurality of set-top boxes, the collecting including polling the plurality of devices based on their membership in a sampling list;

computing a plurality of fractional consumption measures that measure the users' consumption of the television program within a plurality of time segments, including:

identifying the amount of time that the user consumed the television program within the defined time segment including:

assigning a weight to the collected event data which conveys the likelihood that the corresponding event represents a legitimate consumption of the television program, including using a weighting function having an exponentially decaying shape to define the weight, and multiplying an amount of time determined by the event data by the weight to calculate the amount of time that the user consumed the television program;

dividing the amount of time that the user consumed the television program by the total amount of time in the time segment, to provide a fractional consumption measure;

repeating the computing of the measure for plural users and for plural time segments to provide a plurality of fractional consumption measures;

generating statistical information on the basis of the fractional consumption measures; and transmitting a report that identifies the statistical information.

26. One or more machine readable storage media storing machine readable instructions for implementing the method of claim 25.

* * * * *